Patented Jan. 19, 1937

2,068,089

UNITED STATES PATENT OFFICE 2,068,089

EMULSIFIABLE SOLUTIONS OF SULPHUR DIOXIDE

Karl T. Steik, Upper Montclair, and Julius F. Muller, New Brunswick, N. J., assignors to National Oil Products Company, Harrison, N. J.

No Drawing. Application August 27, 1934, Serial No. 741,740

3 Claims. (Cl. 167—14)

Our invention relates to emulsifiable solutions and refers particularly to emulsifiable solutions containing sulphur dioxide.

When sulphur dioxide is brought into contact with water sulphurous acid is formed, but this acid product possesses many practical and commercial disadvantages which have operated against its extended use for many purposes.

We have found, for instance, that sulphurous acid possesses excellent insecticidal, germicidal and bactericidal properties but its aqueous solution is not practically adaptable for these purposes.

Among the objectionable features of an aqueous solution of sulphurous acid are its corroding effect upon metal containers, its facility of conversion into sulphuric acid, and its destructive effect upon foliage.

Our invention, however, overcomes the above-mentioned, and many other, objectionable features of an aqueous solution of sulphurous acid and presents means whereby the full effective properties of the acid may be advantageously employed.

We have found that it is possible to produce emulsifiable solutions of sulphur dioxide in mineral, animal, and vegetable oils and that these solutions possess many advantages over the aqueous solution.

The products of our invention do not corrode metallic containers, the sulphur dioxide is not converted into sulphurous or sulphuric acid during storage and when employed as a spray the non-evaporating and spreading properties of the oils in comparison with these properties of water allow of a greater period of retention of the sulphur dioxide than that of the retention of the sulphur dioxide in the water solution and, hence, the effective concentration of the sulphur dioxide can be greatly reduced without injurious effects upon foliage.

Further, the relative insecticidal, germicidal, and bactericidal effects of an emulsified solution of $SO_2$ in an oil, over that of an aqueous solution, are greatly enhanced by the fact that the oil carrying the $SO_2$ penertates the oily or waxy surface of insects, whereas an aqueous solution is dependent solely upon a surface contact, and the oil spreads over a greater surface of the insect than does the aqueous solution, which remains deposited in drops or globules.

Among the oils which we have found suitable in the production of our emulsifiable products are kerosene, paraffin, heavy lubricating petroleum oils, castor oil, olive oil, linseed oil, fish oils, lard oils, whale oil, etc.

Since sulphur dioxide is an acid anhydride and with water forms sulphurous acid, the emulsifier has to be such that its emulsifying power will not be affected by this acid. We have found that the so-called mahogany mineral oil sulphonates are suitable for this purpose. About 5% of mahogany soaps of good grade is sufficient to produce satisfactory emulsions.

Following is a detailed description for carrying out the invention; a 5% solution of dry mahogany soaps in a mineral oil like 28° paraffin oil is made at first. Into this oil sulphur dioxide gas is bubbled until the oil contains about 2% of it. Such an oil can be kept in ordinary tin cans. Higher concentrations of sulphur dioxide may also be made in suitable containers.

The paraffin oil may be replaced by other mineral oils and by animal and vegetable oils.

The solution thus formed can be stored in metallic containers, it is stable and the sulphur dioxide is not converted into sulphuric acid during storage, it is emulsifiable in water when employed for spraying or other purposes, it is in a highly concentrated condition and hence requires small storage and transit space, portions of it can be employed while retaining the remainder, the full effectiveness of the sulphur dioxide, or sulphurous acid when emulsified in water, can be obtained, and the presence of oil increases such effectiveness as a spray.

It will thus be seen that our invention presents means whereby sulphur dioxide may be shipped and stored in an emulsifiable oil in the form of a non-oxidizing, non-corroding product and which may be readily converted into an emulsion in water, the product thus produced having improved application results over an aqueous solution of sulphur dioxide.

We do not limit ourselves to the particular chemicals, quantities, or steps of procedure specifically mentioned, as these are given simply as a means for clearly explaining our invention.

What we claim is:

1. An emulsifiable solution of dry mahogany mineral oil soaps and paraffin oil containing sulphur dioxide.

2. An emulsifiable solution of dry mahogany mineral oil soaps and castor oil, containing sulphur dioxide.

3. An emulsifiable solution of dry mahogany mineral oil soaps and an oil selected from the group consisting of paraffin oil and castor oil containing sulphur dioxide.

KARL T. STEIK.
JULIUS F. MULLER.